(No Model.)
A. ROESCH.
TEMPERATURE REGULATOR.
No. 602,107. Patented Apr. 12, 1898.
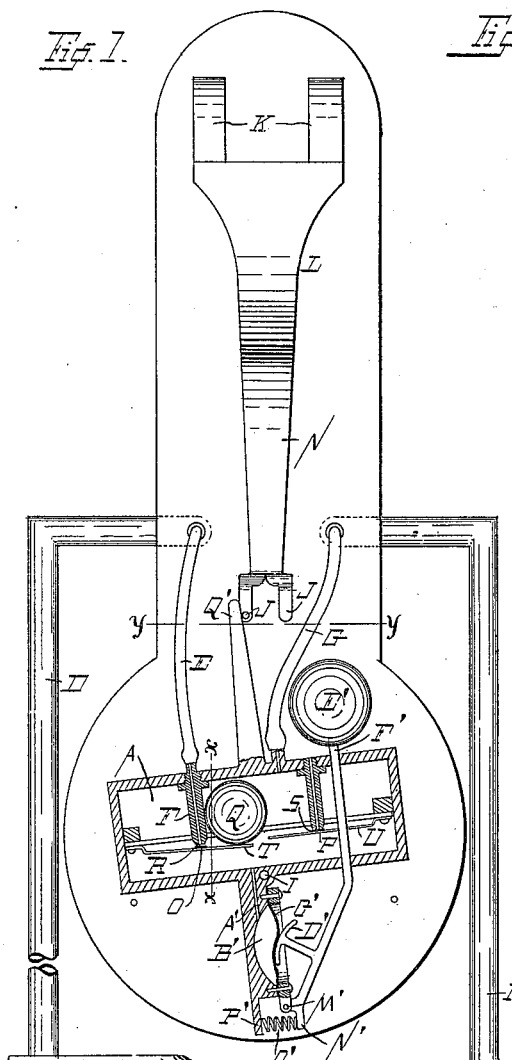
Fig. 1.
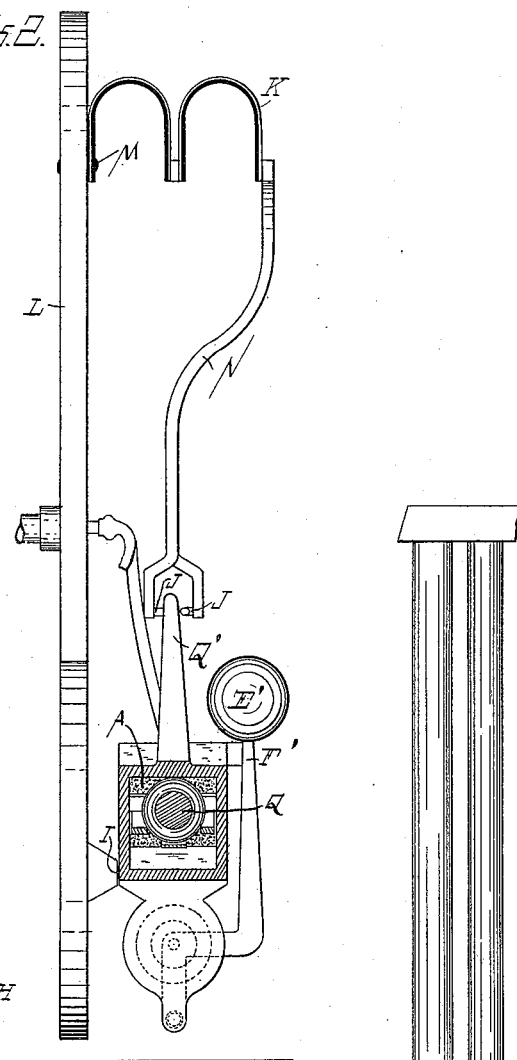
Fig. 2.
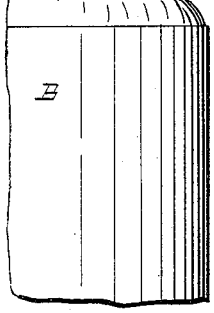
Fig. 3.
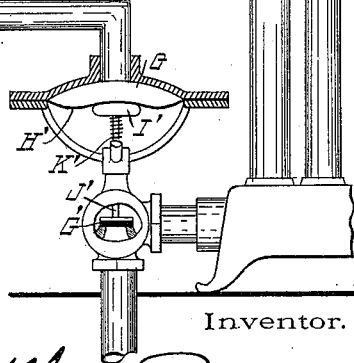
Witnesses.
Inventor.
Alfred Roesch
By Erwin Wheeler & Wheeler
Attorneys.

UNITED STATES PATENT OFFICE.

ALFRED ROESCH, OF BRIDGEPORT, CONNECTICUT, ASSIGNOR TO THE DAVIS & ROESCH TEMPERATURE CONTROLLING COMPANY, OF NEW JERSEY.

TEMPERATURE-REGULATOR.

SPECIFICATION forming part of Letters Patent No. 602,107, dated April 12, 1898.

Application filed July 24, 1897. Serial No. 645,844. (No model.)

*To all whom it may concern:*

Be it known that I, ALFRED ROESCH, a citizen of the United States, residing at Bridgeport, in the county of Fairfield and State of Connecticut, have invented new and useful Improvements in Temperature-Regulators, of which the following is a specification.

My invention relates to improvements in that class of automatic temperature-regulators for which Letters Patent No. 583,632 were granted to me on the 1st day of June, 1897. In said patented device a thermostat is employed to actuate the air-controlling valves, while the compressed air controlled thereby is employed to actuate the steam-controlling valves. By my present improvement the power of the compressed air is employed for the twofold purpose of actuating the power-controlling valve mechanism or motor and the steam-controlling valves, while a thermostat is employed simply as a lock or regulator for governing the action of the valve-controlling mechanism, as may be required to maintain the desired temperature of the room in which the same is located, the motor being adapted to operate independently of the action or presence of the thermostat. It is obvious that by thus utilizing the power of the compressed air to move the valves the duty of the thermostat is comparatively light, and I am consequently enabled to employ a much more sensitive thermostat than could otherwise be used, whereby I am enabled to regulate the temperature of a room with much greater delicacy and precision than it would be possible to do when controlling such air-valves by the direct action of the thermostat.

My invention is further explained by reference to the accompanying drawings, in which—

Figure 1 represents a front view of the regulator, part in section, in connection with a steam-radiator and an air-reservoir. Fig. 2 is a vertical section of the regulator drawn at right angles to that shown in Fig. 1, and Fig. 3 is a horizontal section drawn on line *y y* of Fig. 1.

Like parts are referred to by the same reference-letters throughout the several views.

A represents an oscillating valve-chamber through and by which compressed air is led and controlled in its passage from the air-reservoir B to and from the valve-controlling diaphragm-chamber C. In passing to the diaphragm-chamber C the air is led through the stationary duct D, flexible duct E, valve-duct F, valve-chamber A, flexible duct G, and stationary duct H.

The valve-chamber A is pivotally supported from the base-plate L by the rod I, upon which it is adapted to oscillate toward the right and left at intervals from time to time as it is released from the retaining-catches J J of the thermostat K. The thermostat K is of the ordinary construction, and it is attached at one end to the base-plate L by the bolt M and is provided at its free end with an arm N, to which said catches J J are secured.

The compressed air employed to actuate the diaphragm C also actuates the oscillating chamber A as it passes through such air-chamber from the air-reservoir. Its action is as follows: Presuming the valve-chamber A to be in the position shown in Fig. 1, the valve O is retained in its open position by the gravity of the rolling weight Q, whereby the compressed air from the reservoir B enters said air-chamber and passes down through the air-duct A' to the diaphragm-chamber B'. When acting through the diaphragm C', it forces back said diaphragm C' against the bearing-plate D', whereby the weight E', which is supported upon a swinging arm F', is thrown past the center of gravity of said valve-chamber A upon the right, whereby said valve-chamber A when released from contact with the retaining-catches of the thermostat is caused to oscillate toward the right. It will be obvious that when said valve-chamber oscillates toward the right the weight or ball Q will roll from the spring T upon the spring U, whereby the valve O will be closed and the valve P will be opened, whereby the further admission of compressed air will be cut off, while the compressed air already in said valve-chamber and in the ducts and chambers connected therewith will escape, whereby not only the steam-controlling valve will be permitted to open but the diaphragm C' will also be relieved from the pressure of the compressed air in the chamber B' and said weight E' will be permitted to swing back upon the left of the center of gravity of said air-chamber A, whereby said air-chamber will be caused to oscillate to its former position upon the left, as shown, as soon as released from the retaining-catches of the thermostat.

The arm F' is supported from the oscillating-chamber A upon a pivotal bolt M'. The lower end of said arm F' is provided with a spring bearing-arm N', and a spiral spring O' is interposed between said arm N' and a stationary bearing-lug P'. The spring O' is compressed by the movement of the arm N' as said weight E' is thrown toward the right by the action of the compressed air in the diaphragm-chamber B'. When, however, the compressed air is permitted to escape from said chamber B', as described, said arm N' will be thrown back by the recoil of said spring O', whereby said weight E' will be thrown toward the left.

It will be understood that the relative location of the actuating-spring O' to the pivot M' and the arm F' may, if desired, be changed and a contracting spring may be substituted for the expanding spring shown.

It will now be obvious that by this construction the oscillating movement of the valve-chamber and the consequent movement of the air-controlling valves is in no way dependent upon the action of the thermostat and that were the thermostat to be removed the valve-chamber would be caused to oscillate, as described, by the action of the compressed air alone as long as its supply is maintained.

The oscillating movement of the valve-chamber is controlled by the thermostat as follows: The upper side of the valve-chamber A is provided with a rigid arm Q', which as said valve-chamber oscillates toward the right and left is adapted to move between the opposing ends of the retaining-catches J J and to be alternately brought into engagement with said catches upon the right and left. The opposing ends of the catches J J are beveled at a a, as shown in Fig. 3, so as to be moved laterally slightly by contact of said arm Q' far enough to permit said arm Q' to pass them, when said catches are thrown back again by the elasticity of the arm N, from which they are supported, until one of the catches J J engages the other side of the arm Q' and thus retains the same until drawn out of contact therewith by the action of the thermostat. For example, when the arm Q' is in the position shown in Fig. 1 it engages the catch J upon the left. When, however, the arm N is drawn rearward toward its supporting-base, the arm Q' will escape past the front end of said catch and swing toward the right, when it will be brought against the beveled bearing end of the other catch J upon the right, whereby said arm Q' will be thus retained upon the right until by a change of temperature said retaining-catch J is moved forward by the action of the thermostat, when said arm Q' is again released and permitted to oscillate to its former position, as shown, upon the left, whereby it is obvious that the action of the air-controlling valves is entirely under the control of the thermostat, while the compressed air is the power employed to actuate said valves.

Having thus described my invention, what I claim as new, and desire to secure by Letters Patent, is—

1. In a temperature-regulator, the combination of an oscillating valve-chamber; an inlet air-duct communicating between said valve-chamber and an air-reservoir; an outlet air-duct communicating from said valve-chamber with the diaphragm-chamber of a steam-controlling valve; inlet and outlet air-controlling valves, both located within said valve-chamber and provided with supporting-bearings, by which said valves are automatically thrown in contact with their respective seats; a rolling weight or ball located in said valve-chamber and adapted as said chamber is oscillated toward the right and left, to roll of its own gravity from one side of said valve-supporting bearings, to the other, whereby said valves are alternately opened and closed by the gravity of said weight; and means under control of a thermostat for actuating said oscillating valve-chamber, substantially as and for the purpose specified.

2. In a temperature-regulator, the combination of an oscillating valve-chamber; an inlet air-duct communicating between said valve-chamber and an air-reservoir; an outlet air-duct communicating from said valve-chamber with the diaphragm-chamber of a steam-controlling valve; inlet and outlet air-controlling valves both located within said valve-chamber and provided with supporting-bearings by which said valves are automatically thrown in contact with their respective seats; a weight or ball located in said valve-chamber and adapted, as said chamber is oscillated toward the right and left, to roll of its own gravity from one side of said valve-supporting bearings, to the other, whereby said valves are alternately opened and closed by the gravity of said weight; means for actuating said oscillating valve-chamber; retaining-catches adapted to automatically engage the bearings of said valve-chamber at each end of its oscillatory movement; and a thermostat, adapted as it is moved by the changes of temperature, to release said oscillating chamber from engagement with said retaining-catches, substantially as and for the purpose specified.

3. In a temperature-regulator, the combination of an oscillating valve-chamber; an inlet air-duct communicating between said valve-chamber and an air-reservoir; an outlet air-duct communicating from said valve-chamber with the diaphragm-chamber of a steam-controlling valve; inlet and outlet air-controlling valves both located within said valve-chamber and provided with supporting-bearings by which said valves are automatically thrown in contact with their respective seats; a weight or ball located in said valve-chamber and adapted, as said chamber is oscillated toward the right and left, to roll of its own gravity from one side of said valve-supporting bearings, to the other, whereby said valves are alternately opened and closed by the gravity of said weight; a diaphragm-chamber formed in connection with said oscillating valve-chamber; an air-duct communicating between said valve-chamber and said diaphragm-chamber; a weight-supporting arm pivotally connected with said valve-chamber; a diaphragm plate or bearing communicating between the diaphragm of said diaphragm-chamber and said weight-supporting arm and adapted to move said weight and arm in one direction, past the center of gravity, as said diaphragm is extended by the admission of compressed air; a counteracting spring communicating between the stationary bearing of said valve-chamber and said weight-supporting arm and adapted, when relieved from the action of the compressed air in said diaphragm-chamber, to throw said weight-supporting arm in the opposite direction; an oscillating extension-arm formed in connection with said valve-chamber and adapted, as said chamber is oscillated, to be brought in contact with retaining-catches; a thermostat rigidly affixed to one end of a supporting bed-plate; an arm affixed at one end to the free end of said thermostat; retaining-catches affixed to the free end of said arm; and an oscillating arm or bearing extending from said valve-chamber and adapted to engage the catches supported from said thermostat, all substantially as and for the purpose specified.

4. An oscillating valve-chamber having inlet and outlet ports, an exhaust-port, valves controlling said inlet and exhaust ports and normally closing said ports, a rolling weight or ball controlling the movement of said valves and adapted to retain one or the other alternately in an open position as said valve-chamber is oscillated, substantially as described.

5. An oscillating valve-chamber having inlet and outlet ports, an exhaust-port, valves controlling said inlet and exhaust ports and normally closing said ports, a rolling weight or ball controlling the movement of said valves and adapted to retain one or the other alternately in an open position as said valve-chamber is oscillated, and a weighted arm pivoted to said valve-chamber and adapted to swing on said pivot to oscillate said valve-chamber, substantially as specified.

6. In a temperature-regulator the combination with, an oscillating valve-chamber having inlet and outlet ports, an exhaust-port, valves controlling said inlet and exhaust ports and normally closing said ports, a rolling weight or ball controlling the movement of said valves and adapted to retain one or the other alternately in an open position as said valve-chamber is oscillated, and a weighted arm pivoted to said valve-chamber and adapted to swing on said pivot to oscillate said valve-chamber, and a thermostat governing said oscillating movement of said valve-chamber, of connections between said inlet-port and a fluid-reservoir, connections between said outlet-port and fluid-actuated mechanism and means whereby said weighted arm is swung in one direction by the fluid admitted to said valve-chamber from said reservoir and is permitted to swing in another direction when said fluid is exhausted therefrom, substantially as specified.

In testimony whereof I affix my signature in the presence of two witnesses.

ALFRED ROESCH.

Witnesses:
FRED. H. DAVIS,
CLAES GABR. STRANDBERG.